ated Dec. 23, 1969

United States Patent Office

3,485,796
Patented Dec. 23, 1969

3,485,796
NOVEL POLYAMIDE-IMIDES FROM TRICARBOX-YLIC ACID ANHYDRIDE AND DIANHYDRIDES
Arthur B. Naselow, Philadelphia, Pa., assignor to E. I. du Pont de Nemours and Company, Wilmington, Del., a corporation of Delaware
No Drawing. Filed Apr. 3, 1967, Ser. No. 627,650
Int. Cl. C08g 20/32, 20/00; H01b 3/30
U.S. Cl. 260—47
4 Claims

ABSTRACT OF THE DISCLOSURE

New polyamide-imide modified polyimides and polyamic acids and polyamide-imides having free amine end groups useful as wire enamels, electrical insulators, adhesives, prepreg coatings and heat sealable coatings. The polymers are prepared by a process which comprises:

(1) Reacting a tricarboxylic acid anhydride with a diamine;
(2) Reacting the reaction-product of Step 1 with a dianhydride; and
(3) Heating the reaction-product of Step 2 to an elevated temperature.

SUMMARY OF THE INVENTION

According to this invention, there is provided a new group of polyamide-imides having the following structural formulae:

(1) Polyamide-imide modified polyamic acid,

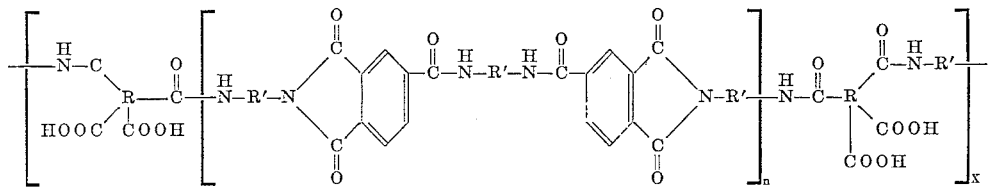

(2) Polyamide-imide modified polyimide,

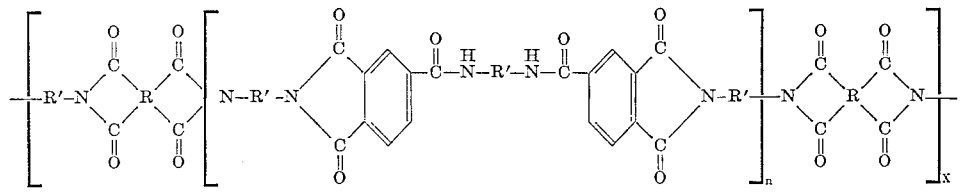

(3) Polyamide-imide having free amine end groups,

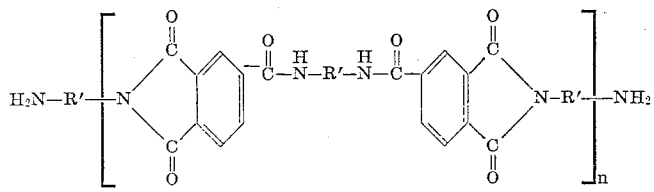

wherein R is an organic tetravalent radical which contains at least two carbon atoms and not more than two carbonyl groups

of each amic acid unit are attached to one carbon atom of the organic tetravalent radical,
R' is a divalent radical containing at least two carbon atoms,
n is an integer sufficient to provide the polyamide-imide with an inherent viscosity of at least 0.1.

x is an integer sufficient to provide the polyamide-imide modified polyamic acid or polyimide with an inherent viscosity of at least 0.15.

There is also provided by this invention a process for the preparation of these novel compounds which comprises, (A) Heating an intimate mixture of a tricarboxylic acid anhydride having the structural formula,

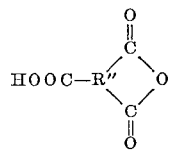

wherein R" is a trivalent organic radical and a primary diamine having the formula $NH_2$—R'—$NH_2$ wherein R' is a divalent organic radical to a temperature of at least 100° C. thereby forming a low molecular weight polyamide-imide, and (B) Reacting the polyamide-imide of step A with a dianhydride having the structural formula,

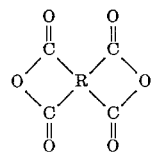

wherein R is a tetravalent organic radical having at least two carbon atoms and not more than two carbonyl groups

are attached to one carbon atom in the tetravalent organic radical at a temperature of at least 60° C. until substantially all of the dianhydride is converted to a polyamide-imide modified polyimide.

Step B of this process can be carried out at a temperature of less than 60° C., in which case a high molecular weight polyamide-imide modified polyamic acid is formed.

This compound is a precursor for the polyamide-imide modified polyimide and is converted to the polyimide by heating it to an elevated temperature.

The starting materials for forming the products of the present invention are organic diamines, tetracarboxylic acid dianhydrides and tricarboxylic acid anhydrides.

The organic diamines are characterized by the formula, $H_2N-R'-NH_2$, wherein R' is a divalent radical and can be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorous, and substituted groups thereof. The most useful diamines are the primary diamines. Although secondary diamines such as piperazine may be used to produce the polyamide-acid compositions of the present invention, only the primary diamines, upon reaction with the dianhydrides, provide polyamide-acids which after shaping may be converted into the polyamides. The preferred R' groups in the diamines are those containing at least 6 carbon atoms characterized by benzenoid unsaturation, i.e.— alternate double bonds in a ring structure. Among the diamines which are suitable for use in the present invention are: metaphenylene diamine; paraphenylene diamine; 4,4' - diamino-diphenyl propane; 4,4'-diaminodiphenyl methane; benzidine; 4,4'-diamine-diphenyl sulfide; 4,4'-diamino-diphenyl sulfone; 3,3'-diamino-diphenyl sulfone; 4,4' - diamino-diphenyl ether; 2,6 - diaminopyridine; bis-(4-amino-phenyl) diethyl silane; bis-(4-amino-phenyl) phosphine oxide; bis-(4-aminophenyl)-N-methylamine; 1,5-diamino-naphthalene; 3,3'-dimethyl-4,4'-diamino-biphenyl; 3,3'-dimethoxy benzidine; 2,4-bis-(beta - amino-t-butyl) toluene; bis-(para-beta-amino-t-butylphenyl)ether; para-bis-(2-methyl - 4 - amino-pentyl) benzene; para-bis-(1,1 - dimethyl - 5 - amino - pentyl) benzene; m-xylylene diamine; p-xylyene diamine; bis(para-amino-cyclohexyl) methane; hexamethylene diamine; heptamethylene diamine; octamethylene diamine; nonamethylene diamine; decamethylene diamine; 3-methyl-heptamethylene diamine; 4,4 - dimethylheptamethylene diamine; 2,11-diamino - docecane; 1,2 - bis - (3 - amino-propoxy) ethane; 2,2 - dimethyl propylene diamine; 3-methoxy-hexamethylene diamine; 2,5 - dimethylhexamethylene diamine; 2,5 - dimethylheptamethylene diamine; 5 - methyl - nonamethylene diamine; 1,4-diamino-cyclohexane; 1,12 - diamino - octadecane;

$H_2N(CH_2)_3O(CH_2)_2O(CH_2)_3NH_2$ $H_2N(CH_2)_3S(CH_2)_3NH_2$ $H_2N(CH_2)_3N(CH_3)(CH_2)_3NH_2$; and mixtures thereof.

Four particularly preferred organic diamines are the species wherein R' in the above structural formula is one of the following radicals:

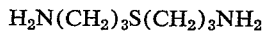

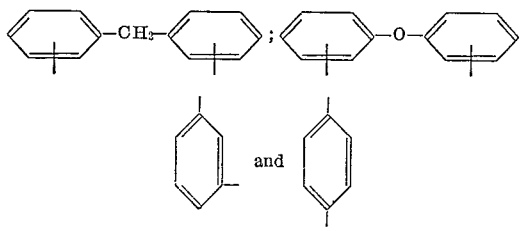

These diamines are readily available and yield good product polymers when used for this invention.

The tetracarboxylic acid dianhydrides are characterized by the following structural formula,

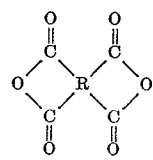

wherein R is a tetravalent organic radical selected from the group comprising aromatic, aliphatic, cycloaliphatic, heterocyclic, combination of aromatic and aliphatic, and substituted groups thereof. However, the preferred dianhydrides are those in which the R groups have at least six carbon atoms characterized by benzenoid unsaturation, i.e.—alternate double bonds in a ring structure, wherein the four carbonyl groups of the dianhydride are each attached to separate carbon atoms and wherein each pair of carbonyl groups is directly attached to adjacent carbon atoms in the R group to provide a five-membered ring as follows:

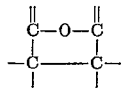

The preferred dianhydrides, as recited above, yield upon reaction with the diamines polyamic acid structures having outstanding physical properties. Some examples of dianhydrides suitable for use in the present invention include pyromellitic dianhydride, 3,3',4,4'-benzophenone tetracarboxylic dianhydride; 2,3,6,7 - naphthalent tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2 - bis(3,4-dicarboxyphenyl) propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl) ether dianhydride; ethylene tetracarboxylic dianhydride; etc.

Three particularly preferred species of tetracarboxylic acid dianhydrides occur when R in the above structural formula is one of the following radicals

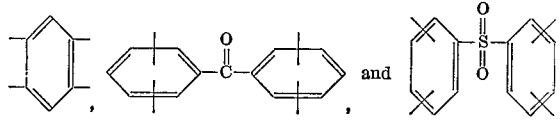

and each carbon atom having a free valence bond has at least one other carbon atom having another free valence bond adjacent to it. These dianhydrides are readily available and produce good product polymers when they are used for this invention.

Tricarboxylic acid anhydrides are characterized by the structural formula

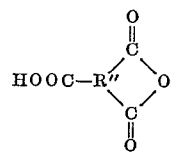

wherein R" is a trivalent organic radical.

Some samples of tricarboxylic acid anhydrides suitable for use with the present invention include trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3'4-tricarboxylic anhydride; 3,4,10-preylene tricarboxylic anhydride; 3,4-dicarboxyphenyl 3-carboxyphenyl ether anhydride; ethylene tricarboxylic anhydride; 1,2,5-naphthalene tricarboxylic anhydride; etc.

The preferred tricarboxylic acid anhydride is trimellitic anhydride because its use in this invention results in polymers having excellent properties.

Solvents useful in the solution polymerization process for preparing the compounds of this invention are the organic solvents whose functional groups do not react with the reactants (diamines, dianhydrides, and trimellitic anhydrides) to a greater extent than the reactants do with each other. Besides being inert to the system and, preferably, being a solvent for the product, the organic solvent must be a solvent for at least one of the reactants, preferably for all of the reactants. To state it another way, the organic solvent is an organic liquid other than reactants or homologs of the reactants that is a solvent for at least 1 reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethyl acetamide. They may eaily be removed from the products by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide and N-acetyl-2-pyrrolidone. The solvents can be used alone, in combinations of solvents, or in combination with poor solvents such as benzene, benzonitrile, dioxane, butyrolactone, xylene, toluene and cyclohexane.

For a further description of diamines, dianhydrides, tricarboxylic acid anhydrides and solvents suitable for use with this invention, see U.S. Patents 2,421,024 and 3,179,614, the disclosures of which are herein incorporated by reference.

The process of this invention can be broken down into two steps which are as follows:

(1) Formation of the polyamide-imide; and
(2) Chain extension.

Step 1 is referred to as the polyamide-imide forming reaction and includes the reaction between the tricarboxylic acid anhydride and the primary diamine to form the polyamideimide which is subsequently chain extended. Addition of between 5% an 25% molar excess of diamine in this step results in a polyamide-imide which is terminated by free amine groups.

Step 2 is referred to as the chain extension reaction and includes the reaction between the polyamide-imide formed in Step 1 and the tetracarboxylic acid dianhydride.

The chain extension can be carried out at a temperature of less than 60° C., in which case a polyamic acid is formed, or at a temperature greater than 60° C., in which case a polyimide is formed. If the chain extending is done at a temperature below 60° C., the resulting polyamide-imide modified polyamic acid can be converted to the polyamide-imide modified polyimide by heating the acid to an elevated temperature.

The polyamide-imide forming reaction of this invention is carried out at a temperature of about at least 100° C., and preferably above 200° C., when atmospheric pressure is used. Temperatures higher than 225° C. are fairly difficult to attain and maintain at normal room pressure, being dependent upon elimination of solvent which in turn increases the solution viscosity of the reaction mixture and complicates the problem of providing sufficient agitation to produce intimate contact between the reactants. Super atmospheric pressures can be used, if desired, to render the process more easily controllable.

The catalyst is present in an amount of at least about 0.01% and usually about 0.01–10% based on the weight of the reactants and preferably 0.03–2% on this basis. Boric acid, phosphoric acid, polyphosphoric acid, triaryl phosphites and trialkaryl phosphites such as triphenyl and tritolyl phosphites as well as trialkyl phosphites and triaralkyl phosphites such as tribenzyl phosphite are catalysts which are useful in the process of this invention. Preferably the individual alkyl groups of the trialkaryl-, trialkyl- and triaralkyl phosphites are lower alkyl groups containing about 1 to 7 carbon atoms.

The catalyst can be added to the reaction vessel initially along with the reactants and solvent or can be withheld until the reaction temperature is reached. Boric acid and polyphosphoric acid catalysts are preferably added after reaction temperature has been reached and maintained for a few hours. Apparently the catalysts of this invention are most effective if added after reaction temperature is reached and maintained for a substantial length of time.

The inherent viscosity of the polymers of this invention means their "true inherent viscosity." The "true inherent viscosity" is measured immediately following the polymer preparation and is to be distinguished from the "false inherent viscosity" which usually results when the polymers are stored for a substantial length of time. Such storage results in an apparent increase in inherent viscosity over the true value but the increase is fales because the polymers still manifest the characteristics (flexibility of cured films, etc.) of its true (lower) inherent viscosity when used. Moreover, the polymer with a false inherent viscosity is converted to its true inherent viscosity by boiling, indicating that the increase in viscosity was not due to an increase in polymer molecular weight but rather to an association of some sort.

Unless specifically stated otherwise, all of the inherent viscosity values used for this invention are obtained from a 0.5% by weight solution of the polymer in N,N-dimethyl acetamide at 25° C.

Low molecular weight polymers are undesirable and this is the reason for setting minimum inherent viscosities on both the polyamide-imide polymer and its chain extended product polymer.

One novel method for preparing the products of this invention has been described above. In addition, these products can be prepared following the teachings of several prior patents. Some of these patents, the disclosures of which are herein incorporated by reference, include U.S. 2,421,024, issued May 27, 1947; U.S. 3,049,518, issued Aug. 14, 1962; U.S. 3,179,635, issued Apr. 20, 1965; U.S. 3,260,691, issued July 12, 1966; and Great Britain 570,858, complete specification accepted July 25, 1945.

The polymers of this invention are useful as wire enamels because of their high thermal resistance. They are also useful as electrical insulators, adhesives, prepreg coatings and heat sealable coatings.

Solutions of polyamide-imide modified polyamic acids can be evaluated as wire coating compositions by applying a coating of these compositions onto number 18 copper wire and heat curing the coatings. Six passes through both the coating composition and oven produce the desired 3 mil build. The results for polymer solutions prepared by the teachings of Examples 1–3 appear in Table I.

TABLE I

| Example | I | II | III |
|---|---|---|---|
| Flexibility: | | | |
| Snap and wrap | 6–7X | 7X–8X | 7X |
| 20% rapid elongation | 2X | 4X | 3X |
| 20% slow elongation | 2X | 4X | 3X |
| Diel. St. (V/M) | ≥3,000 | ≥3,000 | ≥3,000 |
| Abrasion (ITC)(kg.) | 1.8 | 1.7 | |
| Cut-thru, ° F | 450 | 440 | 420 |
| Overload (cycles) (110 v. at 40 amps.) | 35 | 38 | 25 |

The flexibility values indicate the diameters of the wire itself around which the coated wire can be wound without cracking. The lower the number, the more flexible the enamel.

The following examples illustrate the invention. Unless otherwise specified, all parts and percentages are by weight.

EXAMPLE I

One mole of trimellitic anhydride and 1.05 moles of methylene dianiline are dissolved in 550 grams of N-methyl-2-pyrrolidone and heated to a temperature of 220° C.

The water of imidization and amidization is removed. After maintaining the temperature at 220° C. for two hours, 0.03%, based on the polymer solids, of a polyphosphoric acid catalyst is added and the temperature is raised to 225° C. and maintained at this temperature for four hours which results in the formation of a polyamide-imide having free amine end groups. During this period, any additional water formed is immediately removed. The reaction mixture is cooled and diluted to 20% solids with N-methyl-2-pyrrolidone. The inherent viscosity of the

EXAMPLE VI

The experimental procedure and reactants of Example I are used except that metaphenylene diamine is used as the primary diamine. Chain extension with pyromellitic dianhydride or benzophenone tetracarboxylic dianhydride results in polymer solutions with properties similar to those of Examples I–V.

What is claimed is:

1. A polyamide-imide modified polyamic acid consisting essentially of the recurring structural unit,

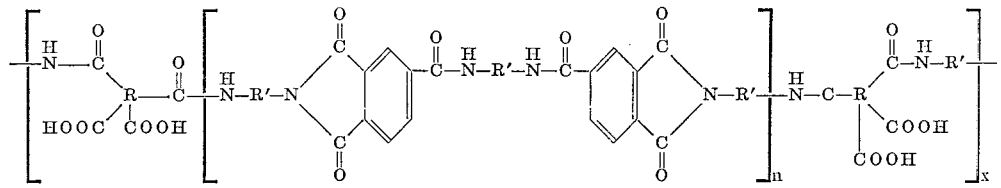

amine-terminated polyamide-imide is 0.25. Solid pyromellitic dianhydride is added to the reaction mixture with stirring until a solids/viscosity relationship of 20% solids/40-60 poises is obtained. About 0.06 moles of pyromellitic dianhydride is required. The inherent viscosity of the resulting polymer is 0.71. Some of the properties obtained for a film made from this polymer are given in Table I.

EXAMPLE II

The experimental procedure and reactants of Example I are used except that the dianhydride used is 3,3′,4,4′-benzophenone tetracarboxylic dianhydride which is added until a solution of 20% solids/70 poises is obtained. Some of the properties obtained for a film made from this polymer are given in Table I.

EXAMPLE III

The experimental procedure and reactants of Example I are used except that the molar excess of methylene dianiline is 10% and pyromellitic dianhydride or benzophenone tetracarboxylic dianhydride is used as the tetracarboxylic acid dianhydride. The product solution properties are similar to those of Examples I and II and the properties obtained for a film made from this polymer are given in Table I.

EXAMPLE IV

The experimental procedure and reactants of Example I are used. A 1/1 molar stoichiometry of trimellitic anhydride/methylene dianiline is used. No catalyst is employed and a reaction time of 13 hours is required to yield a polyamide-imide prepolymer with an inherent viscosity of 0.35. Chain extension is accomplished by the addition of pyromellitic dianhydride. The resulting polymer solution has a solids/viscosity relationship of 24% solids/70 poises and an inert viscosity of 1.0.

EXAMPLE V

The experimental procedure and reactants of Example I are used except that hexamethylene-diamine is used as the primary diamine. Chain extension with pyromellitic dianhydride or benzophenone tetracarboxylic dianhydride gives polymer solutions with properties similar to those in Examples I–IV.

wherein:

R is an organic tetravalent radical which contains at least two carbon atoms and not more than two carbonyl groups

of each amic-acid unit are attached to one carbon atom of said organic radical,

R′ is a divalent radical containing at least two carbon atoms, n is an integer sufficient to provide the polyamide-imide with an inherent viscosity of at least 0.1 measured as a 0.5% by weight solution of the polymer in N,N-dimethylacetamide at 25° C., and x is an integer sufficient to provide the polyamide-imide modified polyamic acid with an inherent viscosity of at least 0.15 measured as a 0.5% by weight solution of the polymer in N,N-dimethylacetamide at 25° C.

2. The polyamide-imide modified polyamic acid of claim 1 wherein

R is selected from the group consisting of

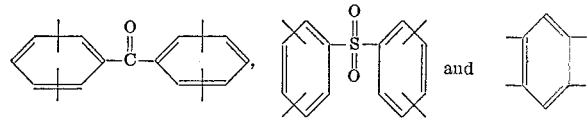

and each carbon atom having a free valence bond has at least one other carbon atom having another free valence bond adjacent to it, and R′ is selected from the group consisting of

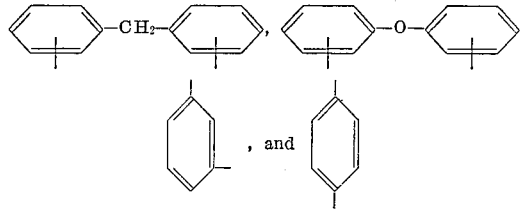

3. A polyamide-imide modified polyimide consisting essentially of the recurring structural unit,

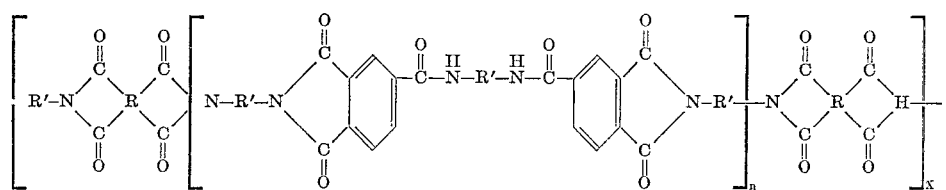

wherein:

R is an organic tetravalent radical which contains at least two carbon atoms and not more than two carbonyl groups

of each amic-acid unit are attached to one carbon atom of said organic tetravalent radical, R' is a divalent radical containing at least two carbon atoms, $n$ is an integer sufficient to provide the polyamide-imide with an inherent viscosity of at least 0.1 measured as a 0.5% by weight solution of the polymer in N,N-dimethylacetamide at 25° C., and $x$ is an integer sufficient to provide the polyamide-imide modified polyimide with an inherent viscosity of at least 0.15 measured as a 0.5% by weight solution of the polymer in N,N-dimethylacetamide at 25° C.

4. The polyamide-imide modified polyimide of claim 3 wherein R is selected from the group consisting of

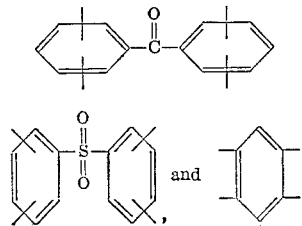

and each carbon atom having a free valence bond has at least one other carbon atom having another free valence bond adjacent to it, and R' is selected from the group consisting of

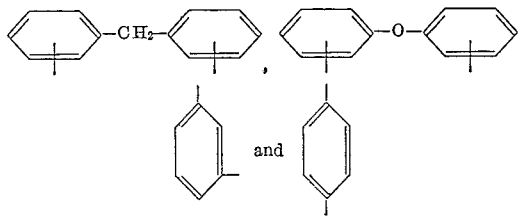

References Cited

UNITED STATES PATENTS

| 3,260,691 | 7/1966 | Lavin et al. | 260—30.2 |
| 3,179,635 | 4/1965 | Frost et al. | 260—78 |
| 3,347,828 | 10/1967 | Stephens et al. | 260—47 |
| 3,355,427 | 11/1967 | Loncrini | 260—47 |

FOREIGN PATENTS 1,075,284   7/1967   Great Britain.

HAROLD D. ANDERSON, Primary Examiner

L. L. LEE, Assistant Examiner

U.S. Cl. X.R.

117—128.4, 161; 260—32.6, 65, 78

PO-1050
(5/69)

UNITED STATES PATENT OFFICE
CERTIFICATE OF CORRECTION

Patent No. 3,485,796      Dated December 23, 1969

Inventor(s) Arthur B. Naselow

It is certified that error appears in the above-identified patent and that said Letters Patent are hereby corrected as shown below:

Claim 1, column 8, first structural formula, that portion reading

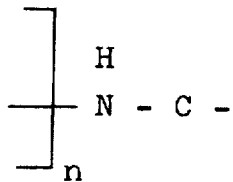  should read  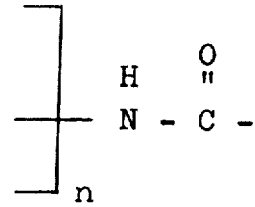

Claim 3, first structural formula (formula at bottom of column 8), that portion reading

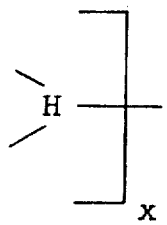  should read  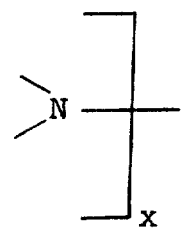

SIGNED AND
SEALED
JUN 30 1970

(SEAL)
Attest:

Edward M. Fletcher, Jr.
Attesting Officer

WILLIAM E. SCHUYLER, JR.
Commissioner of Patents